(No Model.)
D. J. BLASIER.
Feathering Paddle Wheel.
No. 236,666.        Patented Jan. 18, 1881.
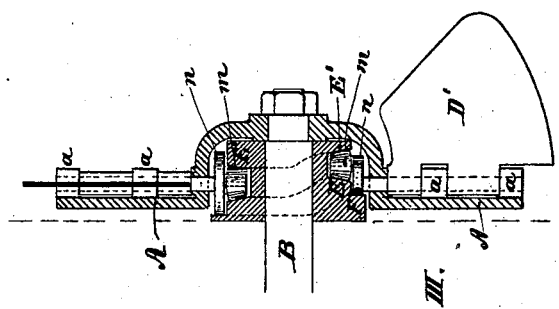
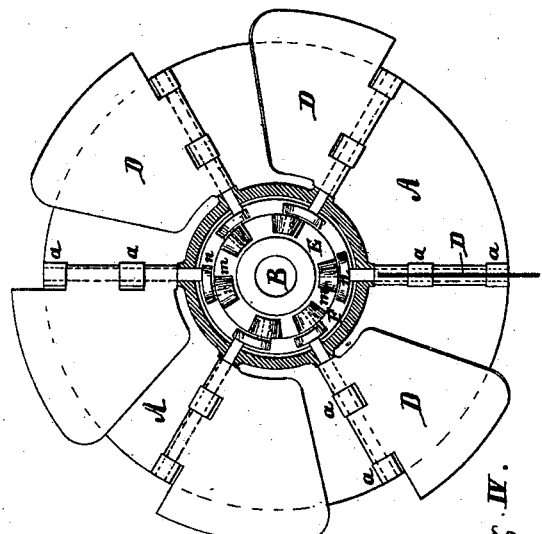
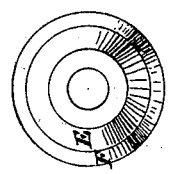
Witnesses.        Inventor.

UNITED STATES PATENT OFFICE.

DAVID J. BLASIER, OF WESTERN, ASSIGNOR OF TWO-THIRDS TO FRANCIS A. BIGGS AND CHARLES C. BAKER, OF BROOKLYN, AND HENRY T. VAN BUSKIRK, OF WESTERNVILLE, NEW YORK.

FEATHERING PADDLE-WHEEL.

SPECIFICATION forming part of Letters Patent No. 236,666, dated January 18, 1881.

Application filed May 28, 1880. (No model.)

*To all whom it may concern:*

Be it known that I, DAVID J. BLASIER, of the town of Western, county of Oneida, State of New York, have invented a new and Improved Feathering Paddle-Wheel, of which the following is a specification.

The nature of my invention consists in the arrangement of a disk or plate attached to the shaft to which the paddles are hinged vertically, and arranging suitable levers at the inner ends of the spindles of said paddles, which are operated by cams attached to the side of the vessel, stationary, whereby the paddles are turned in the desired position.

In the accompanying drawings, Figure I represents a front view of my improved waterwheel. Fig. II is a vertical section of the same. Fig. III shows an end view of the paddle, and Fig. IV a plan of the cam.

Similar letters represent similar parts in all the figures.

A is a plate or disk attached to the shaft B, provided with suitable lugs, $a$, upon which the paddles D are hinged.

E and F are two cam-disks, concentric to each other and firmly attached to the side of the vessel. The inner cam, E, is covered with a corresponding plate or cam, E', so as to form together a groove. The raised surface of both cams, which extends for about one-third of the periphery, is placed at the lower side.

To the inner ends of the spindles of the paddles plates $n$ are attached, working upon the surface of the outer cam, F, and at some distance from the center of the spindles of the paddles friction-rollers $m$ are attached to said plates $n$, working in the cam-groove formed by the two cam-plates E and E'. The friction-rollers $m$, being placed out of the centers of the spindles of the propeller or paddle, form thereby a lever, through which, by the shape of the cams E and E', the paddles receive their proper motion so as to turn the same square to the direction of the water at the bottom, and gradually close the same or turn them back again as soon as they come past the center.

The plates $n$ are made with square edges $s$, to work against and upon the outer cam, F, said edges $s$ being square to the surface of the paddle, whereby a firm resistance and fastening to said paddle is obtained when the same are moved square to the disk or plate A, as shown at D', Fig. II, to withstand the action of the water.

Instead of the plate or disk A, a spider-frame with the necessary lugs may be arranged, and it will be readily understood that, instead of arranging paddles only on one side of this plate, paddles may be arranged on both sides, and double cams be arranged to operate each set of paddles; or two plates or disks, A, may be arranged, one near the side of the vessel and the other one at the outer side of the paddle-box, with the paddles at the inner sides of the plates and opening toward each other, similar to shutters or swing-doors.

What I claim as my invention, and desire to secure by Letters Patent, is—

A paddle, D, hinged vertically to a revolving disk or plate, A, in combination with a guiding-plate, $n$, firmly attached to the inner end of the paddle-spindle, having a straight surface, $s$, square to the surface of the paddle and friction-roller $m$, and sliding or being guided upon suitable stationary cams, F and E, substantially in the manner and for the purpose herein described.

DAVID J. BLASIER.

Witnesses:
HENRY E. ROEDER,
J. B. NONES.